US00RE37900E

(19) United States
(12) Reissued Patent
Partington

(10) Patent Number: US RE37,900 E
(45) Date of Reissued Patent: Nov. 5, 2002

(54) BLADE GROUP WITH PINNED ROOT

(75) Inventor: Albert J. Partington, Upper Providence, PA (US)

(73) Assignee: Siemens Westinghouse Power Corporation, Orlando, FL (US)

(21) Appl. No.: 09/013,471

(22) Filed: Jan. 26, 1998

Related U.S. Patent Documents

Reissue of:
(64) Patent No.: 4,460,316
Issued: Jul. 17, 1984
Appl. No.: 06/454,216
Filed: Dec. 29, 1982

(51) Int. Cl.[7] ..... F01D 5/30
(52) U.S. Cl. ..... 416/217; 416/191; 416/220 R; 416/500
(58) Field of Search ..... 416/217, 191, 416/220 R, 500, 215, 214 R

(56) References Cited

U.S. PATENT DOCUMENTS

| | | | | |
|---|---|---|---|---|
| 2,220,918 A | | 11/1940 | Smith | |
| 2,326,145 A | | 8/1943 | Kroon | |
| 2,405,146 A | | 8/1946 | Huber | |
| 2,745,352 A | | 5/1956 | Zeidler | |
| 3,014,695 A | | 12/1961 | Rankin et al. | |
| 3,576,377 A | | 4/1971 | Beanland et al. | |
| 4,076,455 A | | 2/1978 | Stargardter | 416/191 |
| 4,135,849 A | | 1/1979 | Pigott | 415/119 |
| 5,100,296 A | * | 3/1992 | Partington et al. | 416/217 |

FOREIGN PATENT DOCUMENTS

| | | |
|---|---|---|
| CA | 482144 | 4/1952 |
| DE | 351142 | 8/1956 |
| FR | 684946 | 7/1930 |
| GB | 667979 | 3/1952 |

OTHER PUBLICATIONS

Drawings; Westinghouse Electric Corporation; BLD PINNED SECT 2018–1 LH; Issue Date Jul. 5, 1977.

* cited by examiner

*Primary Examiner*—John Kwon
(74) *Attorney, Agent, or Firm*—Eckert Seamens Cherin & Mellott, LLC

(57) ABSTRACT

A plurality of rotatable turbine blades are formed integral with a shroud and platform and a plurality of arcuate plate root portions which are received by circumferential grooves in a rotor and are fastened to the rotor by three pins extending axially through the root portions and the rotor, the shroud and platform portions having a protrusion on one corner to support the trailing edge of one of the blade portions and a notch in the shroud and the platform on the corner opposite the protrusion whereby the protrusions on one group of blades register with the notch on an adjacent group of blades when the groups of blades are disposed in a circular array on the rotor.

18 Claims, 2 Drawing Sheets

BLADE GROUP WITH PINNED ROOT

Matter enclosed in heavy brackets [ ] appears in the original patent but forms no part of this reissue specification; matter printed in italics indicates the additions made by reissue.

BACKGROUND OF THE INVENTION

This invention relates to rotatable turbine blades and more particularly to a group of blades held on the rotor with pins. Rotatable blades with pin roots have been utilized in turbines for many years. The original pinned root blade groups were welded together. Later, when materials changed so that welding could no longer be utilized, electric discharge machining was utilized to manufacture the blade groups from a block of metal. The blade groups described hereinafter have improved vibratory and steady-state stress characteristics.

SUMMARY OF THE INVENTION

In general, a blade group which attaches to a disc disposed on the shaft of an axial flow turbine, when made in accordance with this invention, comprises a platform portion, multiple blade portions extending radially outwardly from the platform portion, and multiple root portions extending radially inwardly from the platform portion. The root portion comprises generally flat spaced-apart arcuate segments disposed normal to the axis of the shaft and the turbine rotor or disc has circumferential grooves which receive the root portion. Multiple pins extend axially through the root portions and the disc and the platform has a protrusion on one corner and a notch on the opposite corner so that the protrusion in one blade group fits the notch in adjacent blade group when a plurality of blade groups are disposed in a circular array on the rotor.

BRIEF DESCRIPTION OF THE DRAWINGS

The objects and advantages of this invention will become more apparent from reading the following detailed description in conjunction with the accompanying drawings, in which.

DESCRIPTION OF THE PREFERRED EMBODIMENT

Figure 1:
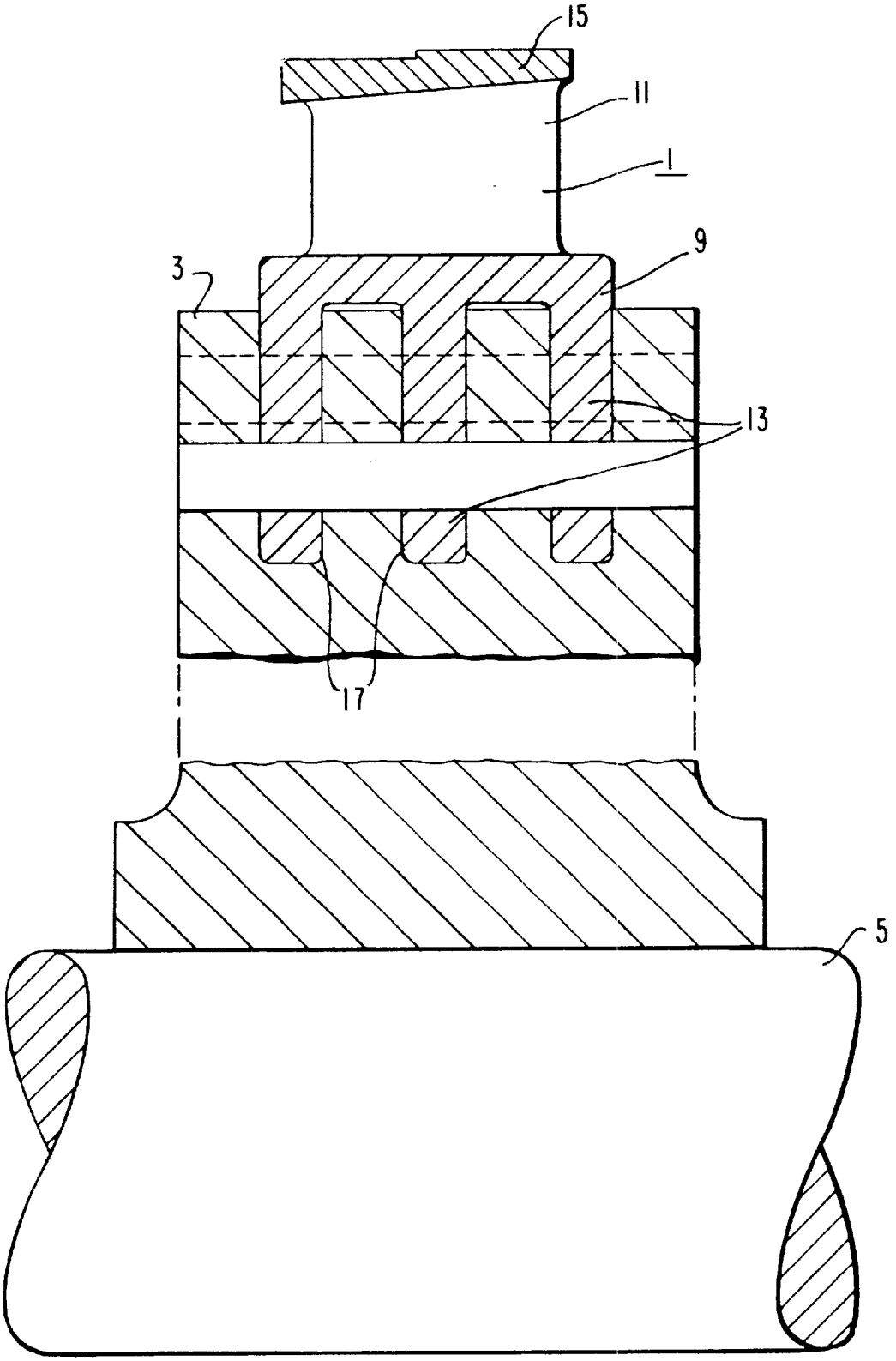
FIG. 1 is a partial sectional view of a rotatable blade group disposed on a rotor disc mounted on a turbine shaft.

Referring now to the drawings in detail and in particular to FIG. 1 there is shown a group of multiple rotatable blades 1 pinned to a disc 3 disposed on the shaft 5 of an axial flow turbine.

Figure 3:
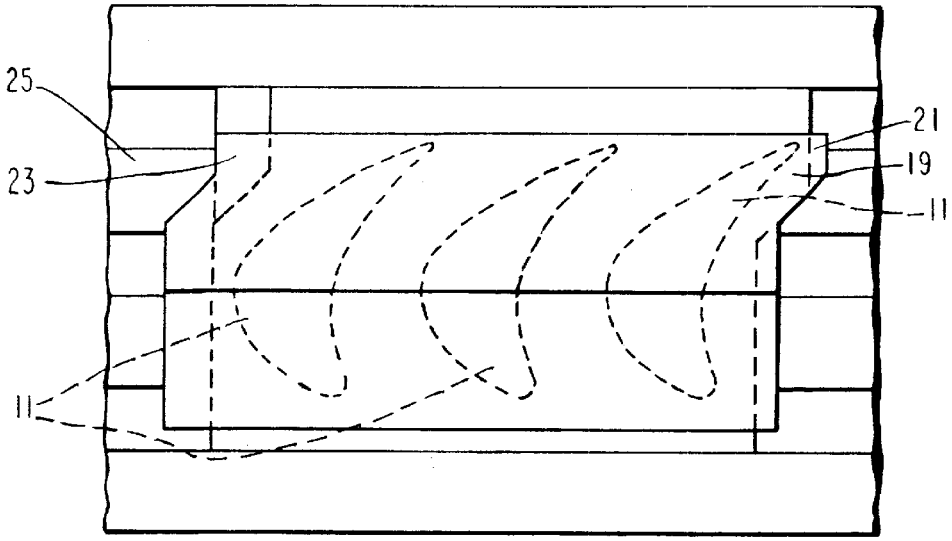
FIG. 3 is a plan view of the blade group.
Figure 2:
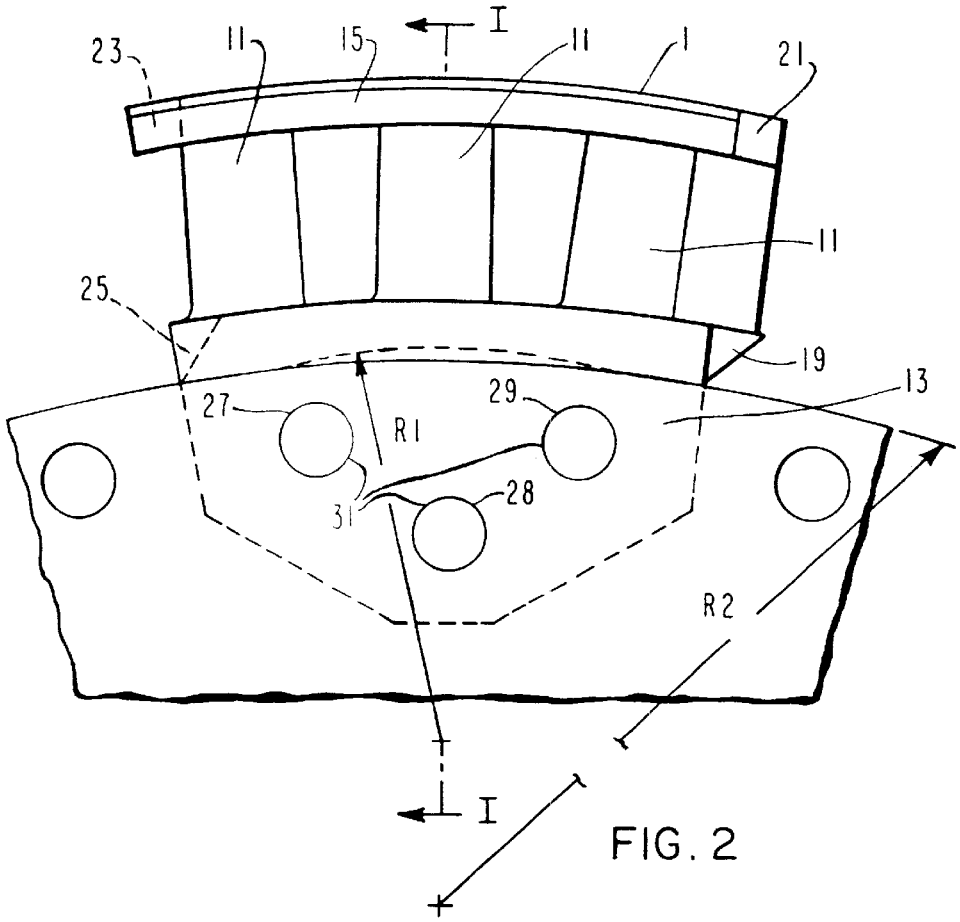
FIG. 2 is an elevational view of a rotor blade group with pinned roots.

As shown in FIGS. 2 and 3 the blade group comprises a platform portion 9 multiple blade portions 11 which extend radially outwardly from the platform portion 9 and multiple root portions 13 which extend radially inwardly from the platform portion 9. Disposed radially outwardly of the blade portion 11 and made integral therewith is a shroud portion 15. The shroud portion 15 is stepped upwardly in the axial direction and is relatively thin in the radial direction.

The disc 3 has a plurality of circumferential grooves 17 adapted to receive the root portions 13 which comprise a plurality of generally flat platelike spaced-apart arcuate segments disposed normal to the axis of the shaft 5. The arcuate root portions 13 and platform 9 are generally the same thickness. The platform portion 9 between the root portions 13 has a central portion with a radius R1 slightly smaller than the radius R2 of the abutting surface of the disc 3 so that the disc 3 only contacts the outer arcuate ends of the platform 9.

The platform and shroud portions 9 and 15 have a protrusion 19 and 21, respectively, disposed on one corner thereof and a notch 23 and 25, respectively, disposed on a corner on the other side of the blade group 1. The protrusions 19 and 21 and notches 23 and 25 register when one blade group is disposed adjacent another blade group on the disc 3 in a circular array. The trailing end of one of the blade portions 11 extends between the protrusions 19 and 21 and the protrusion 19 is chamfered or angled upwardly and outwardly from the bottom to the top of the platform portion 9. Both protrusion 19 and notch 25 have the inner side thereof chamfered or angled inwardly and protrusions 19 and 21 and notches 23 and 25 are angled at their ends from the axial direction.

Three holes 27, 28 and 29 extend axially through the root portion and through the disc 3 and cooperate with pins 31 to fasten each blade group 1 to the disc 3. The outboard holes 27 and 29 are disposed an equal distance from the side margins of the root portions 13 and the hole 28 is disposed radially inwardly from the holes 27 and 29. The hole 28 is also disposed radially inwardly from the center of mass of the shroud portion 15, the blade portion 11, the platform portion 9, and the root portion 13.

The blade groups hereinbefore described have high rigidity and coupled with the high dampening provided by the pin joint, the thin platform and thin shroud provide a minimum vibratory response for a maximum number of vibration frequencies and allow the blade group to withstand high vibratory excitation.

What is claimed is:

1. A blade group which attaches to a disc disposed on a shaft on an axial flow turbine, said blade group comprising:

*a shroud;* a platform portion;

multiple blade portions extending radially outwardly [from] *between* said platform portion *and said shroud*;

multiple root portions extending radially inwardly from said platform portion, *said root portions having root end edges*;

said root portions comprising generally flat spaced-apart arcuate segments disposed normal to the axis of said shaft;

said disc having circumferential grooves which receive said root portions;

multiple pins extending axially through said root portions and said disc;

said platform and *said* shroud each having a protrusion only on one corner and a notch only on an opposite corner of the same axial side of the blade group so that the protrusions on one blade group [fits] *fit* the notches on an adjacent blade group when a plurality of blade groups are disposed in a circular array on the disc, *wherein said protrusion on said platform extends in a direction normal to a radial line and normal to the turbine axis beyond the respective root end edges of all of said root portions and has a slanted surface between the root end edges of said root portions and a top surface of said platform*; and a trailing end of one of the blades in each blade group is disposed between the protrusion on the shroud and the protrusion on the platform.

2. A blade group as set forth in claim 1, wherein the space between the root [portion] *portions* has an arcuate surface having a radius smaller than the radius of the outer diameter of the disc.

3. A blade group as set forth in claim 1, wherein the shroud has an axially disposed step therein.

4. A blade group as set forth in claim 3, wherein the step raises on the downstream side of said blade group.

5. A blade group as set forth in claim 1, wherein the thickness of said platform portion is generally equal to the thickness of the arcuate root portions.

6. A blade group as set forth in claim 1, wherein the root portion comprises three generally flat spaced-apart arcuate segments and the center of mass of the blade portions and the center of mass of the shroud portions are centrally disposed over the middle arcuate root segment.

7. A blade group as set forth in claim 6, wherein there are three pins arranged in a triangular relationship.

*8. A blade group as set forth in claim 1, wherein said pins include outboard pins and a lower pin, and at least said outboard pins extend through each root portion at positions that are substantially equidistant from said edges.*

*9. A blade group as set forth in claim 1, wherein said protrusion on said platform is chamfered from a bottom to a top of said platform portion.*

*10. A blade group as set forth in claim 1, wherein the side edges of all of the root portions are substantially aligned.*

*11. A blade group which attaches to a disc disposed on a shaft of an axial flow turbine, said blade group comprising:*

*a shroud;*

*a platform portion;*

*multiple blade portions extending radially outwardly between said platform portion and said shroud;*

*multiple root portions extending radially inwardly from said platform portion, each root portion having root end edges;*

*said root portions comprising generally flat space-apart arcuate segments disposed normal to the axis of said shaft, wherein the space between the root portion has a arcuate surface having a radius smaller than the radius of the outer diameter of the disc;*

*said disc having circumferential grooves which receive said root portions;*

*a plurality of pins extending axially through said root portions and said disc, wherein at least outboard ones of said pins extend through said root portions at positions that are substantially equidistant from the root end edges;*

*said platform and said shroud each having a protrusion only on one corner and a notch only on an opposite corner on the same axial side of the blade group so that the protrusions on one blade group fit the notches on an adjacent blade group when a plurality of blade groups are disposed in a circular array on the disc, wherein said protrusion on said platform extends beyond the respective root end edges of all of said root portions in a direction normal to the root end edges of the root portions; and*

*a trailing end of one of the blades in each blade group is disposed between the protrusion on the shroud and the protrusion on the platform.*

*12. A blade group as set forth in claim 11, wherein the shroud has an axially disposed step therein.*

*13. A blade group as set forth in claim 12, wherein the step raises on the downstream side of said blade group.*

*14. A blade group as set forth in claim 11, wherein the thickness of said platform portion is generally equal to the thickness of the arcuate root portions.*

*15. A blade group as set forth in claim 11, wherein the root portion comprises three generally flat spaced-apart arcuate segments and the center of mass of the blade portions and the center of mass of the shroud portions are centrally disposed over the middle arcuate root segment.*

*16. A blade group as set forth in claim 15, wherein there are three pins arranged in a triangular relationship.*

*17. A blade group as set forth in claim 11, wherein said protrusion is chamfered from a bottom to a top of said platform portion.*

*18. A blade group as set forth in claim 11, wherein the side edges of all of the root portions are substantially aligned.*

* * * * *